(12) United States Patent
Kim (10) Patent No.: US 10,108,570 B2
(45) Date of Patent: Oct. 23, 2018

(54) SEMICONDUCTOR DEVICE INCLUDING PLURALITY OF FUNCTION BLOCKS AND OPERATING METHOD THEREOF

(71) Applicant: SK hynix Inc., Gyeonggi-do (KR)

(72) Inventor: Kwang Hyun Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 577 days.

(21) Appl. No.: 14/800,362

(22) Filed: Jul. 15, 2015

(65) Prior Publication Data
US 2016/0259744 A1    Sep. 8, 2016

(30) Foreign Application Priority Data
Mar. 3, 2015    (KR) .................. 10-2015-0029816

(51) Int. Cl.
*G06F 13/364* (2006.01)
*G06F 13/40* (2006.01)
*G06F 13/42* (2006.01)

(52) U.S. Cl.
CPC .......... *G06F 13/364* (2013.01); *G06F 13/404* (2013.01); *G06F 13/4282* (2013.01)

(58) Field of Classification Search
CPC ... G06F 13/364; G06F 13/4282; G06F 13/404
See application file for complete search history.

(56) References Cited

U.S. PATENT DOCUMENTS

2003/0061293 A1    3/2003    Steindl

FOREIGN PATENT DOCUMENTS

KR    1019990042652    6/1999

*Primary Examiner* — Idriss N Alrobaye
*Assistant Examiner* — Dayton Lewis-Taylor
(74) *Attorney, Agent, or Firm* — IP & T Group LLP (57) ABSTRACT

Disclosed is a semiconductor device including: a bus; a slave function block coupled to the bus; a master function block coupled to the bus through a bus interface, and suitable for providing a bus ID to the slave function block together with a request when transmitting the request to the slave function block; and a subordinate slave function block suitable for monitor the bus interface. The subordinate slave function block catches the data communicated together with the bus ID is matched to any one of a plurality of determined bus IDs.

14 Claims, 6 Drawing Sheets

SEMICONDUCTOR DEVICE INCLUDING PLURALITY OF FUNCTION BLOCKS AND OPERATING METHOD THEREOF

CROSS-REFERENCE TO RELATED APPLICATION

The present application claims priority to Korean patent application number 10-2015-0029816, filed on Mar. 3, 2015, the entire disclosure of which is herein incorporated by reference in its entirety.

BACKGROUND

1. Field

The present invention relates to an electronic device and, more particularly, to a semiconductor device and an operating method thereof.

2. Discussion of Related Art

A semiconductor device may include function blocks for performing a variety of operations. The function blocks are connected to a bus and communicate with each other to through the communication protocol of the bus.

Each function block may serve as a master function block and a slave function block. When a first function block and a second function bock communicate through the bus, the first function block may transmit a read request to the second function block, and the second function block may transmit data to the first function block in response to the read request. Otherwise, when the first function block transmits a write request and then data to the second function block, the second function block may store the transmitted data in response to the write request. In this example, the first function block is the master function block, and the second function block is the slave function block operating for the first function block. A single function block may serve as both a master function block and a slave function block.

SUMMARY

The present invention directed toward a semiconductor device having improved operation speed and an operating method thereof.

An embodiment of the present invention provides a semiconductor device, including: a bus; a slave function block coupled to the bus; a master function block coupled to the bus through a bus interface, and suitable for providing a bus ID to the slave function block together with a request when transmitting the request to the slave function block through the bus interface and the bus; and a subordinate slave function block suitable for monitoring the bus interface, wherein the master function block and the slave function block communicate data corresponding to the request, along with the bus ID, and wherein the subordinate slave function block catches the data communicated with the bus ID when the bus ID communicated on the bus interface is matches one of a plurality of determined bus IDs.

The subordinate slave function block may include an operation memory storing the plurality of determined bus IDs.

The subordinate slave function block may process the caught data according to a value of the determined bus ID.

The subordinate slave function block may include an internal memory having a plurality of storage areas, and the subordinate slave function block stores the processed data in one of the storage areas according to the value of the determined bus ID.

The master function block may read the processed data stored in the subordinate slave function block based on the determined bus ID.

The slave function block may be a Random Access Memory (RAM), the master function block may be a memory controller coupled with a non-volatile memory, and the subordinate slave function block may be a Redundant Array of Independent Disks (RAID) controller.

The request may be a read request for the data stored in the RAM, the memory controller may transmit the bus ID to the RAM together with the read request, and the RAM may transmit the data to the memory controller in response to the read request, along with the bus ID.

The RAID controller may catch the data and processes the caught data when the bus ID transmitted with the data on the bus interface matches one of the determined bus IDs.

the RAID controller may include an internal memory having first storage areas and a second storage area. The RAID controller may generate parity bits for the caught data, and store the parity bits in one of the first storage areas according to the value of the determined bus ID. The second storage area may store the determined bus IDs.

The memory controller may be coupled to the RAID controller through a direct interface, and the memory controller may store the data provided from the RAM in the non-volatile memory, in such a manner that the memory controller may read the parity bits through the direct interface and store the parity bits in the non-volatile memory.

The slave function block may be a RAM, the master function block may be a controller coupled with a non-volatile memory, and the subordinate slave function block may be a data compressing unit.

The memory controller may provide the bus ID to the RAM together with the request, the memory controller and the RAM may communicate the data along with the bus ID after the request, and the data compressing unit may catch the data and processes the caught data when the bus ID transmitted together with the data on the bus interface is matched to any one among the determined bus IDs.

The data compressing unit may compress or decompress the caught data according to first bits among the bits of the determined bus ID.

The data compressing unit may include an internal memory including first storage areas and a second storage area, the data compressing unit may store the processed data in any one of the first storage areas according to second bits among the bits of the determined bus ID, and the second storage area may store the determined bus IDs.

The semiconductor device may further include a processing unit coupled to the bus, in which the processing unit may load the processed data to the RAM from the data compressing unit through the bus.

Another exemplary embodiment of the present invention provides a method of operating a semiconductor device including a master function block coupled to a bus through a bus interface. The method may include: transmitting a request from the master function block to a slave function block through the bus interface and the bus along with a bus ID; transmitting the bus ID together with data in response to the request between the master function block and the slave function block; and catching the data when the bus ID communicated on the bus interface matches one of a plurality of determined bus IDs.

The method may further include processing the caught data according to a value of the determined bus ID.

The semiconductor device may include a plurality of storage areas, and the processing may include storing the processed data in one of the storage areas according to the value of the determined bus ID.

The method may further include storing the determined bus IDs.

An exemplary embodiment of the present invention provides a semiconductor device, including: first and second function blocks suitable for communicating a request and corresponding data along with a bus ID identifying the request and the corresponding data; and a third function block suitable for performing an operation with the corresponding data according to a command when the bus ID is substantially identical to a determined bus ID of an ID table storing the command corresponding to the determined bus ID.

According to the exemplary embodiments of the present invention, the semiconductor device with an improved operation speed and the operating method thereof are provided.

The foregoing summary is illustrative only and is not intended to be limiting in any way. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present invention will become more apparent to those of ordinary skill in the art by describing in detail embodiments thereof with reference to the attached drawings in which.

DETAILED DESCRIPTION

Hereinafter, exemplary embodiments according to the present invention will be described in detail with reference to the accompanying drawings. In the description below, it should be noted that only what is necessary for understanding the present invention will be described, and other descriptions may be omitted to avoid unnecessarily obscuring the subject matter of the present invention. However, the present invention is not limited to the exemplary embodiments described herein, and may be implemented in other ways. The exemplary embodiments are provided to describe the present invention in detail so that those skilled in the art may easily carry out the technical spirit of the present invention.

Throughout this specification and the claims that follow, when it is described that an element is "coupled" to another element, the element may be "directly coupled" to the other element or "indirectly coupled" to the other element through a third element. Throughout the specification and the claims, unless explicitly described to the contrary, the word "comprise" and variations such as "comprises" or "comprising" will be understood to imply the inclusion of stated elements but not the exclusion of any other elements.

Figure 1:
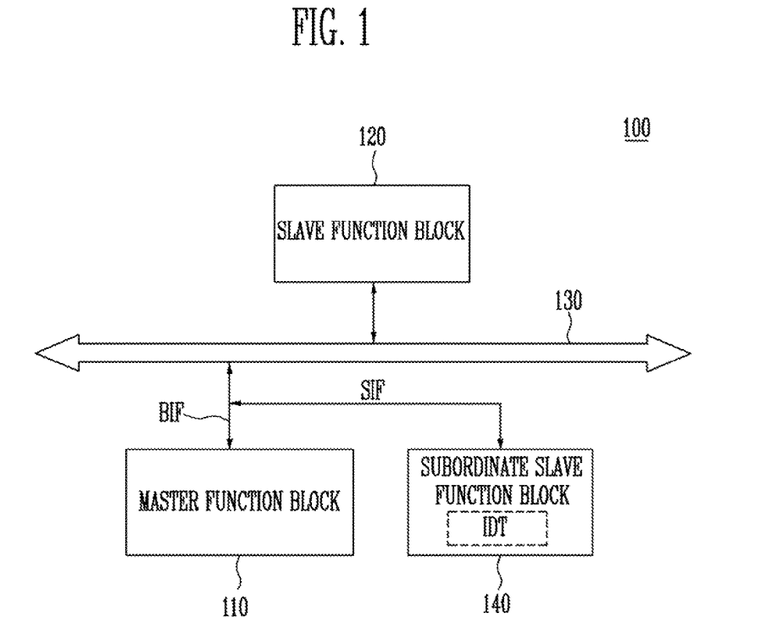
FIG. 1 is a block diagram illustrating a semiconductor device according to an exemplary embodiment of the present invention.

FIG. 1 is a block diagram illustrating a semiconductor device 100 according to an exemplary embodiment of the present invention.

Referring to FIG. 1, the semiconductor device 100 may include a master function block 110, a slave function block 120, a bus 130, and a subordinate slave function block 140. Each of the master function block 110, the slave function block 120, the bus 130, and the subordinate slave function block 140 may perform a specific function.

The master function block 110 may be coupled to a bus 130 through a bus interface BIF. The master function block 110 and the slave function block 120 may communicate ire a channel provided by the bus 130 through the bus interface BIF according to a predetermined protocol. For example, the predetermined protocol may be the "Advanced eXtensible Interface" (AXI) protocol. The master function block 110 may control the slave function block 120 through the bus interface BIF and the bus 130. When the master function block 110 transmits a request to the slave function block 120, the slave function block 120 may perform a corresponding operation in response to the request, and transmit an operation result to the master function block 110 as data. When the master function block 110 transmits a request to the slave function block 120, and then transmits data, which corresponds to the request to the slave function block 120, the slave function block 120 may perform a corresponding operation with the received data in response to the request.

According to the exemplary embodiment, the request may include a control signal and an address signal. The control signal may include information, such as a type and a length of the data corresponding to the request, and the address signal may include information indicating a storage space within the slave function block.

The slave function block 120 may perform an operation under the control of the master function block 110. Although not illustrated in FIG. 1, the slave function block 120 may include an interface for communication between the slave function block 120 and the bus 130.

The bus 130 may provide a channel for communication between the master function block 110 and the slave function block 120. According to the exemplary embodiment, the bus 130 may provide the communication channel according to the AXI protocol.

The master function block 110 may transmit a bus IDentification (ID) together with the request when transmitting the request to the slave function block 120. The bus ID may comprise a plurality of bits. The bus ID may be used for identifying data corresponding to the request. For example, the master function block 110 may transmit the request and the bus ID to the slave function block 120, and then transmit the data corresponding to the request and the same bus ID to the slave function block 120. The slave function block 120 may identify the request and the corresponding data based on the same bus ID. For example, when the master function block 110 transmits the request and the bus ID to the slave function block 120, the slave function block 120 may transmit the operation result data and the same bus ID in response to the request. The master function block 110 may identify the operation result data in response to the request based on the same bus ID.

According to an embodiment of the present invention, the subordinate slave function block 140 may be coupled through the bus interface BIF and a subordinate interface SIF. The subordinate slave function block 140 may include an internal memory, and the internal memory stores an ID table IDT. The ID table IDT may include a plurality of predetermined bus IDs and a plurality of commands corresponding to the plurality of predetermined bus IDs. The subordinate slave function block 140 may monitor the bus interface BIF through the subordinate interface SIF. Among the bus IDs transferred through the bus interface BIF between the master function block 110 and the slave function block 120, the subordinate slave function block 140 may detect the predetermined bus IDs based on the ID table IDT.

When detecting the predetermined bus ID of the ID table IDT among the bus IDs transferred between the master function block 110 and the slave function block 120, the subordinate slave function block 140 may catch the data transmitted with the predetermined bus ID on the bus interface BIF. Accordingly, when the data between the master function block 110 and the slave function block 120 is to be provided from one of the master function block 110 and the slave function block 120 to the subordinate slave function block 140, a process for transmitting the data from one of the master function block 110 and the slave function block 120 to the subordinate slave function block 140 may be skipped due to the data catch of the subordinate slave function block 140. The subordinate slave function block 140 may catch the data of the predetermined bus ID while the master function block 110 and the slave function block 120 communicate with each other. Accordingly, operation speed of the semiconductor device 100 may be improved due to the skip of the transmission of the data from one of the master function block 110 and the slave function block 120 to the subordinate slave function block 140.

According to the exemplary embodiment of the present invention, the subordinate slave function block 140 may monitor the bus interface BIF, which consumes less resources than monitoring the bus 130 coupled to the plurality of function blocks.

As described above, among the bus IDs transferred through the bus interface BIF between the master function block 110 and the slave function block 120, the subordinate slave function block 140 may detect the predetermined bus IDs based on the ID table IDT and catch the data of the detected predetermined bus ID. According to the exemplary embodiment of the present invention, it is based on the bus ID that the subordinate slave function block 140 may catch the data transferred between the function blocks 110 and 120. Therefore, separate definitions of meta-information and additional transmission of the meta-information may not be required for the subordinate slave function block 140 to catch the data. The subordinate slave function block 140 may catch the data only based on the bus ID. Accordingly, simplified communication may be performed between the master function block 110 and the slave function block 120, and the subordinate slave function block 140 may obtain target data without wait for transmitting the data from one of the master function block 110 and the slave function block 120 to the subordinate slave function block 140.

Then, the subordinate slave function block 140 may perform its own operation with the caught data according to the command stored in the ID table IDT and corresponding to the predetermined bus ID.

Figure 2:
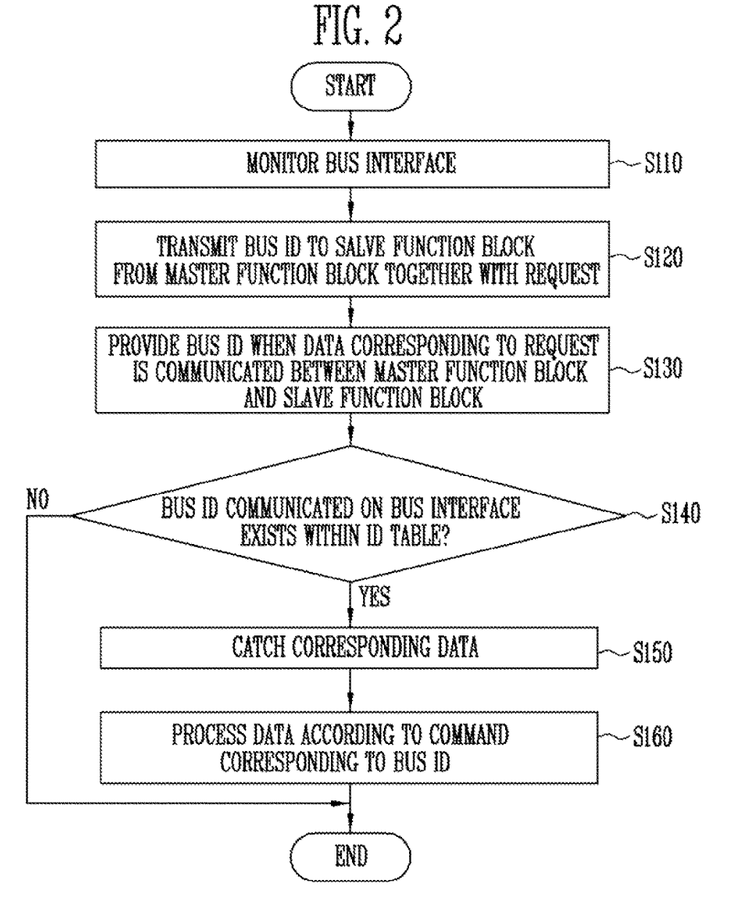
FIG. 2 is a flowchart illustrating an operating method of the semiconductor device shown in FIG. 1.
Figure 3:
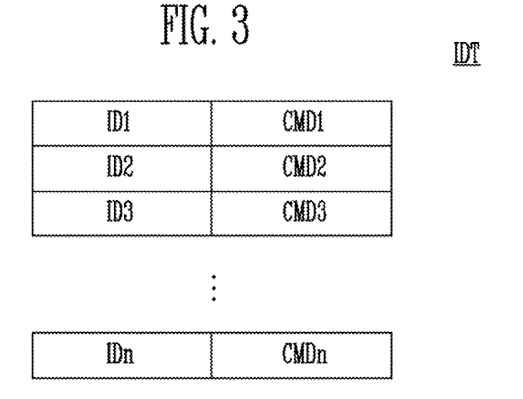
FIG. 3 is a diagram conceptually illustrating an ID table.

FIG. 2 is a flowchart illustrating an operating method of the semiconductor device 100. FIG. 3 is a diagram conceptually illustrating the ID table IDT.

Referring to FIGS. 1 and 2, the subordinate slave function block 140 monitors the bus interface BIF at step S110. At step S120, a bus ID may be transmitted from the master function block 110 to the slave function block 120 together with a request. Then, at step S130, data corresponding to the request may also be transmitted between the master function block 110 and the slave function block 120 along the same bus ID as transmitted with the request.

At step S140, the subordinate slave function block 140 determines whether the bus ID transferred with the data on the bus interface BIF is the predetermined bus ID of the ID table IDT. When the bus ID is the predetermined bus ID, step S150 may be performed. At step S150, the subordinate slave function block 140 may catch the data transmitted together with the predetermined bus ID.

At step S160, the subordinate slave function block 140 processes the data according to the command corresponding to the bus ID. The subordinate slave function block 140 may perform the process with the caught data according to the command in the ID table IDT corresponding to the bus ID.

Referring to FIG. 3, the ID table IDT may include first to $n^{th}$ predetermined bus IDs ID1 to IDn. The first to $n^{th}$ predetermined bus IDs ID1 to IDn may correspond to first to $n^{th}$ commands CMD1 to CMDn, respectively. That is, the subordinate slave function block 140 perform operations according to the first to $n^{th}$ commands CMD1 to CMDn corresponding to the first to $n^{th}$ predetermined bus IDs ID1 to IDn. According to the exemplary embodiment, the subordinate slave function block 140 may process the caught data according to the predetermined bus ID. For example, the internal memory within the subordinate slave function block 140 is divided into a plurality of storage areas, and the subordinate slave function block 140 may store the processed data in a selected storage area among the plurality of storage areas according to the predetermined bus IDs. According to the exemplary embodiment, the predetermined bus ID may indicate a predetermined operation for the caught data which is to be performed by the subordinate slave function block 140. For example, when the subordinate slave function block 140 is suitable for compressing and decompressing the caught data, the subordinate slave function block 140 may compress or decompress data according to the predetermined bus ID. For example, when the subordinate slave function block 140 is suitable for correcting an error of the caught data, the subordinate slave function block 140 may select a type of error correction code according to the predetermined bus ID, and correct an error of the caught data through the selected error correction code. One or more of a Bose, Chaudhri, Hocquenghem (BCH) code, a Reed Solomon code, and a Hamming code may be selected as the error correction code. In addition, it will be appreciated that various operations of the subordinate slave function block 140 may correspond to different predetermined bus IDs, respectively.

The subordinate slave function block 140 may be commanded according to the predetermined bus ID as described above, so that the subordinate slave function block 140 may process the caught data according to the predetermined bus ID without a separate request for the process of the caught data from one of the master function block 110 and the slave function block 120 to the subordinate slave function block 140. Accordingly, the semiconductor device 100 having improved operation speed is provided.

The data processed by the subordinate slave function block 140 may be stored inside the subordinate slave function block 140 and, then, the master function block 110 may read the processed data from the subordinate slave function block 140 based on the predetermined bus ID.

Figure 4:
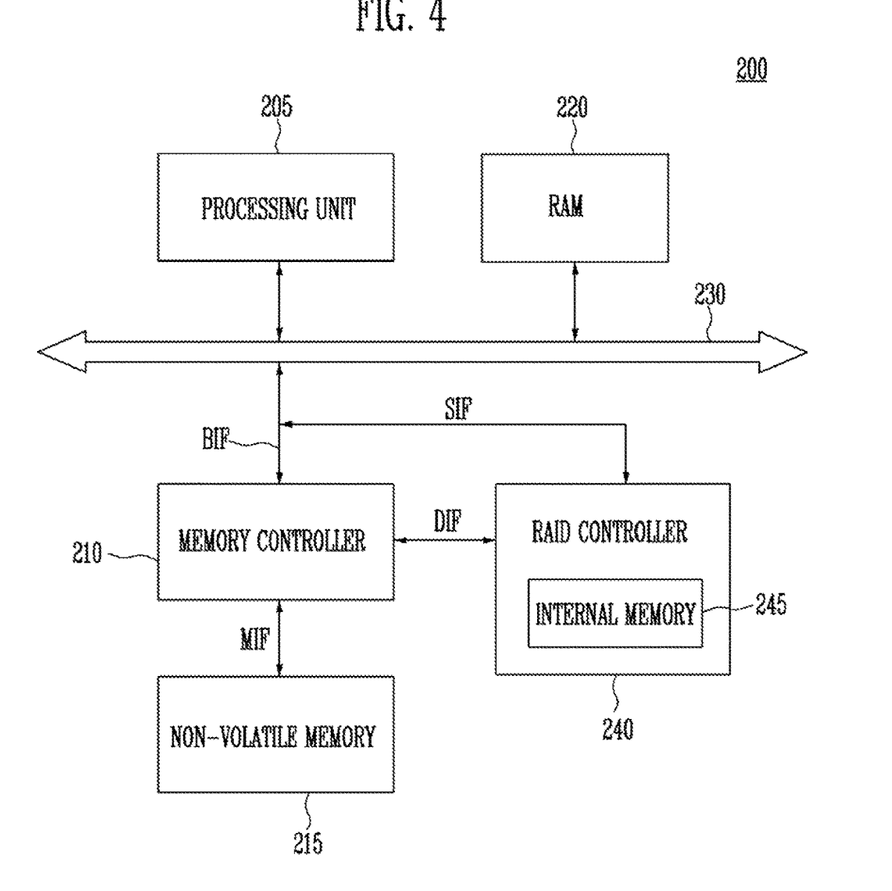
FIG. 4 is a block diagram illustrating an example of the semiconductor device shown in FIGS. 1 to 3.

FIG. 4 is a block diagram illustrating an example 200 of the semiconductor device 100 described with reference to FIGS. 1 to 3.

Referring to FIG. 4, the semiconductor device 200 may include a processing unit 205, a memory controller 210, a non-volatile memory 215, a Random Access Memory (RAM) 220, a bus 230, and a Redundant Array of Independent Disks (RAID) controller 240.

The processing unit 205 may be coupled to the bus 230. The processing unit 205 may control general operations of the semiconductor device 200 under the control of an external host (not shown). The processing unit 205 may be coupled to a separate storage medium storing firmware, and may operate according to the firmware stored in the corresponding storage medium. The processing unit 205 may serve as the flash translation layer (FTL).

The memory controller 210 may be coupled to the bus 230 through the bus interface BIF, which is described with reference to FIGS. 1 to 3 and is coupled to the non-volatile memory 215 through a memory interface MIF. The memory controller 210 may be the master function block 110 described with reference to FIGS. 1 to 3. The memory controller 210 may be coupled to the RAID controller 240 through a direct interface DIF.

The memory controller 210 may control the non-volatile memory 215 under the control of the processing unit 205. The memory controller 210 may control a read operation, a program operation, an erase operation, and a background operation of the non-volatile memory 215 under the control of the processing unit 205. The memory controller 210 may read data from the RAM 220, and program the read data in the non-volatile memory 215. The memory controller 210 may read data from the non-volatile memory 215, and store the read data in the RAM 220.

The RAM 220 may be coupled to the bus 230. The RAM 220 may be the slave function block 120 described with reference to FIGS. 1 to 3. The RAM 220 may operate under the control of the processing unit 205 and the memory controller 210. The RAM 220 may serve as a buffer memory between the external host and the non-volatile memory 215. The RAM 220 may serve as an operation memory of the processing unit 205.

The processing unit 205 may temporarily store data, which is to be programmed in the non-volatile memory 215, into the RAM 220. Hereinafter, data stored or to be stored in the RAM is referred to as RAM data. The memory controller 210 may read RAM data through the bus 230, and program the read RAM data in the non-volatile memory 215. The memory controller 210 may transmit a request for reading the RAM data (hereinafter, a "read request") along with a bus ID to the RAM 220. In response to the read request, the RAM 220 may transmit the RAM data corresponding to the read request to the memory controller 210 along with the same bus ID as transmitted from the memory controller 210 to the RAM 220.

The RAID controller 240 may be coupled to the bus interface BIF through the subordinate interface SW described with reference to FIGS. 1 to 3. The RAID controller 240 may be the subordinate slave function block 140 described with reference to FIGS. 1 to 3. The RAID controller 240 may include an internal memory 245 storing the ID table IDT described with reference to FIGS. 1 to 3. The RAID controller 240 may monitor the bus interface BIF through the subordinate interface SIF. Among the bus IDs transferred through the bus interface BIF between the memory controller 210 and the RAM 220, the RAID controller 240 may detect the predetermined bus IDs based on the ID table IDT. When the RAM 220, in response to the read request, transmits the RAM data corresponding to the read request to the memory controller 210 along with the predetermined bus ID, the RAID controller 240 may detect the predetermined bus IDs based on the ID table IDT, and may catch the RAM data of the predetermined bus ID. That is, the subordinate slave function block 140 may catch the data which the slave function block 120 transmits to the master function block 110, as described with reference to FIGS. 1 to 3.

Then, the RAID controller 240 may process the caught RAM data according to the command corresponding to the predetermined bus ID. The RAID controller 240 may generate parity bits for the RAM data, and store the generated parity bits in the internal memory 245. The RAID controller 240 may generate the parity bits according to the RAID level 5 or 6.

Figure 5:
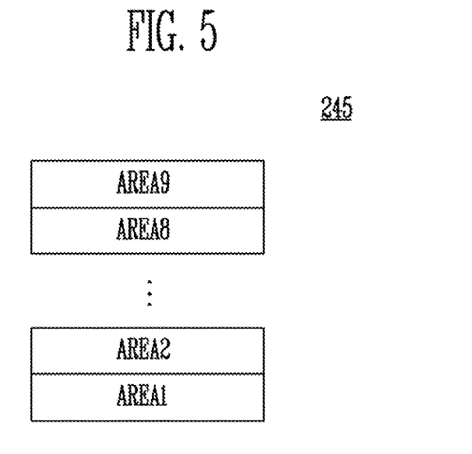
FIG. 5 is a diagram illustrating an internal memory shown in FIG. 4.

FIG. 5 is a diagram conceptually illustrating the internal memory described with reference to FIG. 4.

Referring to FIG. 5, the internal memory 245 may be divided into a plurality of storage areas AREA1 to AREA9. A ninth storage area AREA9 among the plurality of storage areas AREA1 to AREA9 may store the ID table.

The RAID controller 240 may perform an operation to the caught RAM data according to the command corresponding to the predetermined bus ID. For example, among the plurality of bits of the predetermined bus ID, most significant bits among the plurality of bits may correspond to a command for generation of the parity bits. Any one among the first to eighth areas AREA1 to AREA8 may be specified by least significant bits among the plurality of bits. For example, the first storage area AREA1 may be specified by the three least significant bits "000" of the predetermined bus ID. The RAID controller 240 may generate parity bits for the RAM data according to the generation command corresponding to the predetermined bus ID, and store the generated parity bits in the first storage area AREA1 also corresponding to the predetermined bus ID.

Figure 6:
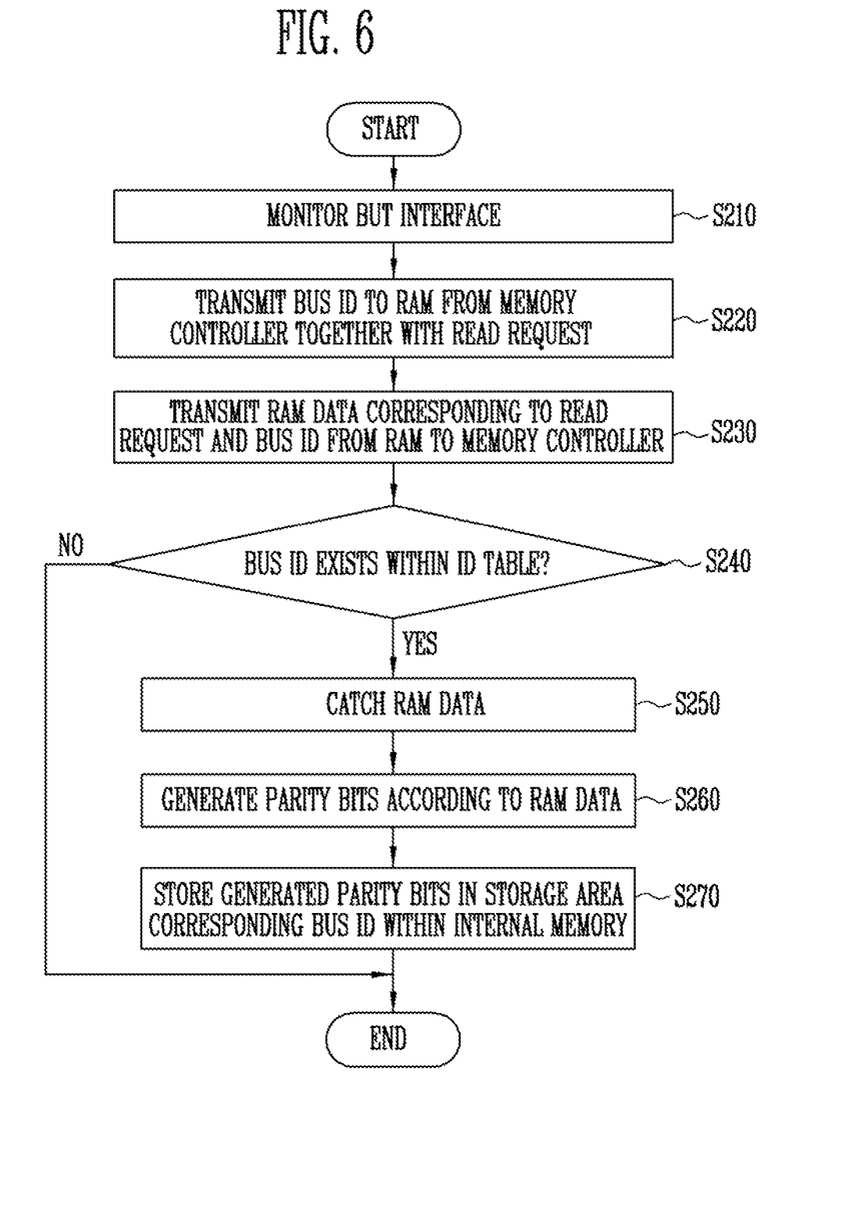
FIG. 6 is a flowchart illustrating an operating method of the semiconductor device shown in FIG. 4.

FIG. 6 is a flowchart illustrating an operating method of the semiconductor device 200 described with reference to FIG. 4.

Referring to FIGS. 4 and 6, at step S210, the RAID controller 240 may monitor the bus interface BIF through the subordinate interface SIF. At step S220, the memory controller 210 may transmit a bus ID together with a read request to the RAM 220. At step S230, the RAM 220 may transmit the RAM data corresponding to the read request along with the same bus ID to the memory controller 210. The memory controller 210 may store the received RAM data in the non-volatile memory 215. The non-volatile memory 215 may include a plurality of memory areas, and the memory controller 210 may distribute and store the RAM data in the plurality of memory areas.

At step S240, the RAID controller 240 determines whether the bus ID transmitted together with the RAM data of step 230 is the predetermined bus ID of the ID table IDT. When the bus ID transmitted together with the RAM data of step 230 is the predetermined bus ID within the ID table IDT, step S250 is performed. At step S250, the RAID controller 240 may catch the RAM data transferred from the RAM 220 to the memory controller 210 along with the predetermined bus ID.

At step S260, the RAID controller 240 may generate parity bits for the caught RAM data according to the generation command corresponding to the predetermined bus ID. At step S270, the RAID controller 240 may store the generated parity bits in one of the first to eighth storage areas AREA1 to AREA8 corresponding to the predetermined bus ID.

Then, the memory controller 210 may read the parity bits stored in the internal memory 245 through the direct interface DIF based on the predetermined bus ID, and program the read parity bits in the non-volatile memory 215.

Figure 7:
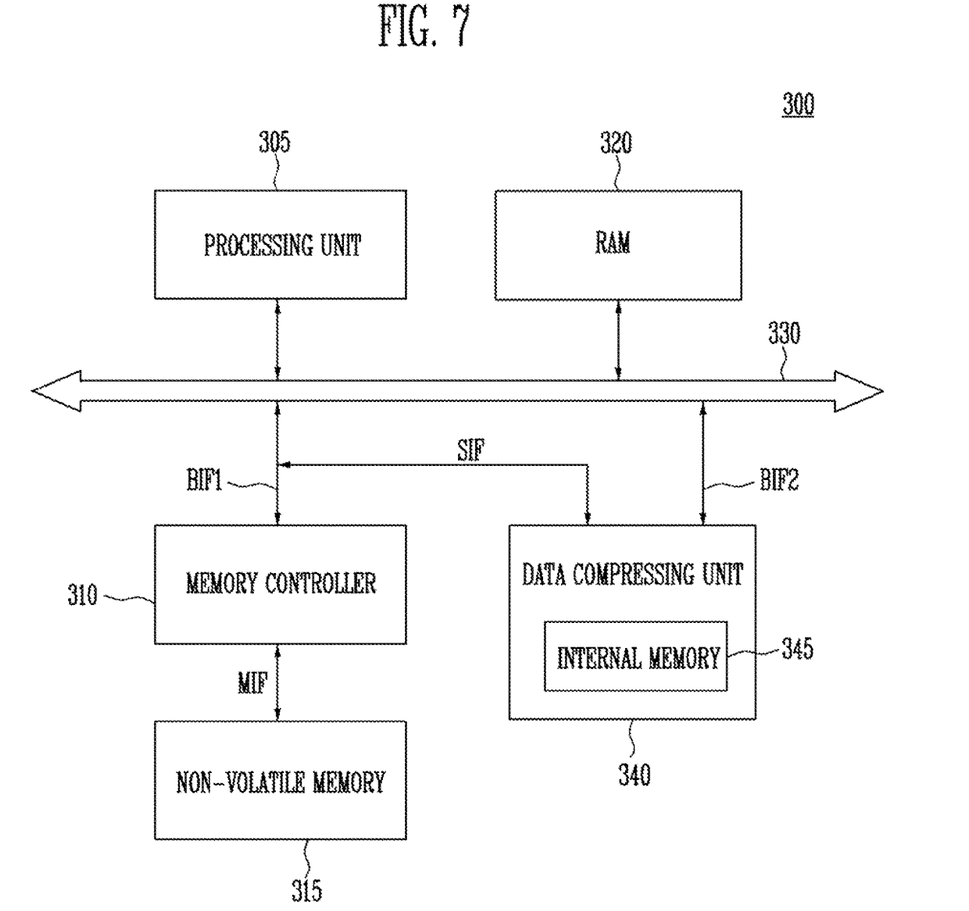
FIG. 7 is a block diagram illustrating another example of the semiconductor device shown in FIG. 1.

FIG. 7 is a block diagram illustrating another example 300 of the semiconductor device 100 described with reference to FIGS. 1 to 3.

Referring to FIG. 7, the semiconductor device 300 may include a processing unit 305, a memory controller 310, a non-volatile memory 315, a RAM 320, a bus 330, and a data compressing unit 340.

The processing unit 405 may be coupled to the bus 430, and control general operations of the semiconductor device 300 under the control of an external host (not shown). The processing unit 302 may be the same as the processing unit 205 described with reference to FIGS. 4 to 6.

The memory controller 310 may be coupled to the bus 330 through a first bus interface BIF1, which is similar to the bus interface BIF described with reference to FIGS. 1 to 3, and may be coupled to the non-volatile memory 315 through a memory interface MIF, which is similar to the memory interface MIF described with reference to FIGS. 4 to 6. The memory controller 310 may be the master function block 110 described with reference to FIGS. 1 to 3. The memory controller 310 may control the non-volatile memory 315 under the control of the processing unit 305.

The RAM 320 may be coupled to the bus 330. The RAM 320 may be the slave function block 120 described with reference to FIGS. 1 to 3. The RAM 320 may be the same as the RAM 220 described with reference to FIGS. 4 to 6.

The data compressing unit 340 may be the subordinate slave function block 140 described with reference to FIGS. 1 to 3. The data compressing unit 340 may monitor the first bus interface BIF1 through the subordinate interface SIF described with reference to FIGS. 1 to 3. The data compressing unit 340 may be coupled to the bus 330 through the second bus interface BIF2, which is similar to the bus interface BIF described with reference to FIGS. 1 to 3.

The data compressing unit 340 may include an internal memory 345 storing the ID table described with reference to FIGS. 1 to 3. The data compressing unit 340 may monitor the first bus interface BIF through the subordinate interface SIF. Among the bus IDs transferred through the first bus interface BIF between the memory controller 310 and the RAM 320, the data compressing unit 340 may detect the predetermined bus IDs based on the ID table IDT.

The memory controller 310 may store data read from the non-volatile memory 315 in the RAM 320 as the RAM data. The memory controller 310 may transmit a request for storing the RAM data (hereinafter, a "write request") in the RAM 320 and a bus ID to the RAM 320. After the write request, the memory controller 310 may transmit the RAM data to the RAM 320 along with the same bus ID as transmitted along with the write request. The data compressing unit 340 may catch the RAM data.

In order to load data necessary for an operation of the processing unit 305 from the non-volatile memory 315 to the RAM 320, the processing unit 305 may control the memory controller 310 to read data from the non-volatile memory 315, and temporarily store the read data in the RAM 320. For example, a map table for the flash translation layer (FTL) may be loaded to the RAM 320 from the non-volatile memory 315.

When the memory controller 310 transmits the RAM data to the RAM 320 along with the predetermined bus ID, the data compressing unit 340 may detect the predetermined bus IDs based on the ID table IDT, and may catch the RAM data of the predetermined bus ID. That is, the subordinate slave function block 140 may catch the data which the master function block 110 transmits to the slave function block 120, as described with reference to FIGS. 1 to 3.

The data compressing unit 340 may process the caught RAM data according to the command in the ID table IDT corresponding to the predetermined bus ID. The data compressing unit 340 may compress the caught RAM data, and store the compressed RAM data in a specific storage area of the internal memory 345. Also, the data compressing unit 340 may decompress the caught RAM data, and store the decompressed RAM data in a specific storage area of the internal memory 345. The data compressing unit 340 may compress or decompress the caught RAM Data according to the command corresponding to the predetermined bus ID. The data compressing unit 340 may store the compressed or decompressed RAM data according to the predetermined bus ID in any one of the storage areas AREA1 to AREA8 of the internal memory 345, as described with reference to FIG. 5. Accordingly, the memory controller 310 may control the data compressing unit 340 to perform operations with the caught RAM data through the predetermined bus ID, which originally serves for identifying the RAM data transferred to the RAM 320.

Then, the processing unit 305 may control the data compressing unit 340 to load the compressed or decompressed RAM data, which is stored the internal memory 345, to the RAM 320. The RAM data, which is currently stored in the RAM 320 by the memory controller 310, may be substituted with the compressed or decompressed RAM data. The data compressing unit 340 may transmit the compressed or decompressed RAM data to the RAM 320 through the second bus interface BIF2. For example, in order to output the compressed data stored in the non-volatile memory 315 to the external host, the compressed data may be loaded to the RAM 320 from the non-volatile memory 315 while the data compressing unit 340 catches and decompresses the compressed data. Then, the compressed data currently loaded in the RAM 320 may be substituted with the decompressed data of the data compressing unit 340. The decompressed data may be provided to the external host. For example, in order to load the map table for the flash translation layer to the RAM 320 from the non-volatile memory 315, the decompressed map data of the non-volatile memory 315 may be loaded to the RAM 320 while the data compressing unit 340 catches and compresses the decompressed map data. Then, the decompressed map data currently loaded in the RAM 320 may be substituted with the compressed data of the data compressing unit 340. Therefore, the storage space for the map table may be reduced within the RAM 320.

Figure 8:
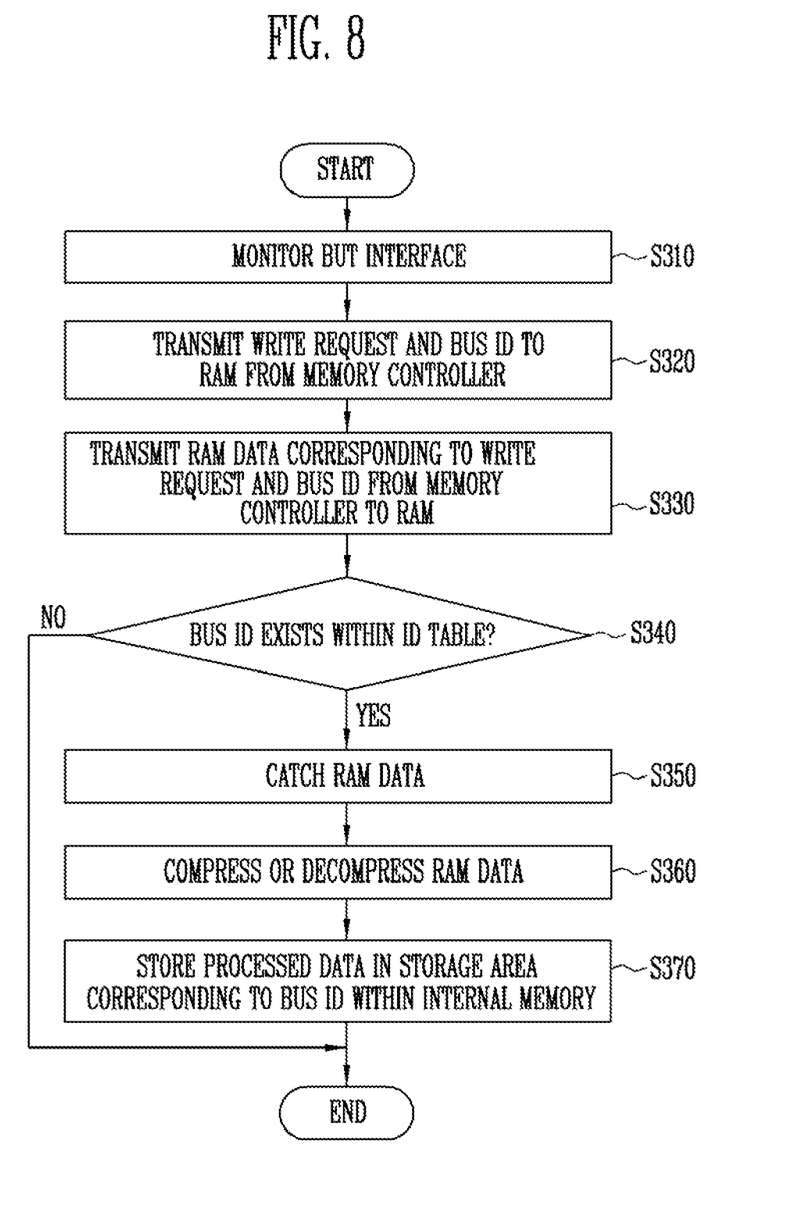
FIG. 8 is a flowchart illustrating an operating method of the semiconductor device shown in FIG. 7.

FIG. 8 is a flowchart illustrating an operating method of the semiconductor device 300 described with reference to FIG. 7.

Referring to FIGS. 7 and 8, at step S310, the data compressing unit 340 may monitor the first bus interface BIF1 through the subordinate interface SIF. At step S320, the memory controller 310 may transmit the write request and a bus ID to the RAM 220. At step S330, the memory controller 310 may transmit the RAM data corresponding to the write request and the same bus ID to the RAM 320. The RAM 320 may identify the RAM data corresponding to the write request based on the same bus ID, and store the RAM data.

At step S340, the data compressing unit 340 determines whether the bus ID transmitted together with the RAM data of step 330 is the predetermined bus ID within the ID table IDT. When the bus ID transmitted together with the RAM data of step 230 is the predetermined bus ID within the ID table IDT, step S350 may be performed. At step S350, the data compressing unit 340 may catch the RAM data transferred from the memory controller 310 to the RAM 320 along with the predetermined bus ID.

At step S360 the data compressing unit 340 may compress or decompress the RAM data according to the compression or decompression command corresponding to the predetermined bus ID. For example, among the plurality of bits of the predetermined bus ID, most significant bits may correspond to the compression or decompression command.

At step S370, the data compressing unit 340 may store the compressed or decompressed RAM data in a storage area indicated by the predetermined bus ID within the internal memory 345. For example, any one of the first to eighth storage areas AREA1 to AREA8 of the internal memory 345 may be selected according to three least significant bits of the predetermined bus ID, and the compressed or decompressed data may be stored in the selected storage area.

Then, the compressed or decompressed data may be provided to the RAM 320 through the second bus interface BIF2.

In addition, it will be appreciated that the subordinate slave function block 140 described with reference to FIGS. 1 to 3 may be modified. For example, the semiconductor device 300 of FIG. 7 may include an error correction block for correcting data according to an error correction code, and the error correction block may be the subordinate slave function block 140, which is similar to the data compressing unit 340. The error correction block may catch the data transmitted by the memory controller 310 to the RAM 320 based on the predetermined bus ID of the ID table IDT. Further, the error correction block may perform error correction on the caught data, and store the corrected data in the internal memory. Then, the corrected data may be provided to the RAM 320 through the bus interface BIF2. The error correction block may catch the data transmitted to the memory controller 310 based on the predetermined bus ID. Then, the error correction block may add parity bits for the error correction to the caught data, and store the processed data in the internal memory. Then, the memory controller 310 may read the processed data from the error correction block through the direct interface DIF and program the processed data in the non-volatile memory 315.

According to the exemplary embodiments of the present invention, the subordinate slave function block may catch data based on predetermined bus IDs of the ID table IDT in the bus IDs exchanged between the function blocks for identifying data transferred on the bus. Further, the subordinate slave function block may process the caught data according to the command corresponding to the predetermined bus ID in the ID table IDT. The subordinate slave function block may process the caught data according to the predetermined bus ID without a separate request for the processing of the caught data from one of the master and slave function blocks to the subordinate slave function block. Accordingly, the semiconductor device having improved operation speed is provided.

Embodiments have been disclosed in the drawings and the specification. The specific terms are for illustration, and do not limit the scope of the present invention defined in the claims. Those skilled in the art will appreciate that various modifications and equivalent examples may be made without departing from the scope and spirit of the present disclosure. Therefore, the scope of the present invention will be defined by the claims, below.

What is claimed is:

1. A semiconductor device, comprising:
a memory controller configured to provide a write request and a bus ID indicating the write request and to provide data corresponding to the write request with the bus ID;
a random access memory configured to receive the write request and the bus ID from the memory controller through a bus and to store the data when the data with the bus ID is received from the memory controller through the bus; and
a data compressing unit configured to receive the data with the bus ID when the bus ID matches a predetermined bus ID, and to perform a command corresponding to the bus ID on the data,
wherein the data compressing unit includes an ID table storing a plurality of commands corresponding to a plurality of predetermined bus IDs, respectively.

2. The semiconductor device of claim 1,
wherein the data compressing unit is further configured to compress or decompress the data according to the bus ID.

3. The semiconductor device of claim 1,
wherein the bus ID includes a plurality of bits, and
wherein the data compressing unit is further configured to compress or decompress the data according to a first bit among the plurality of bits.

4. The semiconductor device of claim 3,
wherein the data compressing unit includes an internal memory including a plurality of storage areas and stores compressed data or decompressed data in a selected storage area among the plurality of storage areas according to second bits among the plurality of bits.

5. The semiconductor device of claim 4, further comprising:
a processing unit configured to load the compressed data or the decompressed data to the random access memory.

6. A method of operating a semiconductor device including a memory controller for controlling a non-volatile memory, a random access memory for temporarily storing data to be stored in the non-volatile memory, a data compressing unit for compressing or decompressing the data and a bus for connecting the memory controller, the random access memory and the data compressing unit, the method comprising:
transmitting a write request and a bus ID indicating the write request from the memory controller to the random access memory through the bus;
transmitting data corresponding to the write request with the bus ID from the memory controller to the random access memory
receiving, by the data compressing unit, the data with the bus ID; and
performing, by the data compressing unit, a command corresponding to the bus ID on the data.

7. The method of claim 6,
wherein the data compressing unit includes an ID table storing a plurality of commands corresponding to a plurality of predetermined bus IDs, respectively, and
wherein the receiving comprises:

detecting, by the data compressing unit, whether the bus ID matches one of the plurality of predetermined bus IDs; and receiving, by the data compressing unit, the data transmitted with the bus ID.

8. The method of claim 6, wherein the performing comprises compressing or decompressing, by the data compressing unit, the data according to the bus ID.

9. The method of claim 6, wherein the bus ID includes a plurality of bits, wherein the data compressing unit includes an internal memory including a plurality of storage areas, and wherein the performing comprises:

compressing or decompressing, by the data compressing unit, the data according to a first bit among the plurality of bits; and storing, by the data compressing unit, compressed data or decompressed data in a selected storage area among the plurality of storage areas according to second bits among the plurality of bits.

10. A semiconductor device, comprising:

a memory controller configured to provide a read request and a bus ID indicating the read request;

a random access memory configured to transmit data with the bus ID to the memory controller in response to the read request; and a RAID (Redundant Array of Independent Disks) controller configured to receive the data with the bus ID when the bus ID matches a predetermined bus ID, and to perform a command corresponding to the bus ID on the data, wherein the RAID controller includes an ID table storing a plurality of commands corresponding to a plurality of predetermined bus IDs respectively.

11. The semiconductor device of claim 10, wherein the RAID controller generates parity bits for the data.

12. The semiconductor device of claim 10, wherein the bus ID includes a plurality of bits, and wherein the RAID controller is further configured to generate parity bits for the data according to a first bit among the plurality of bits.

13. The semiconductor device of claim 12, wherein the RAID controller includes an internal memory including a plurality of storage areas and stores generated parity bits in a selected storage area among the plurality of storage areas according to second bits among the plurality of bits.

14. The semiconductor device of claim 13, wherein the memory controller reads the parity bits and programs the parity bits in a non-volatile memory.

\* \* \* \* \*